(12) United States Patent
Sánchez-Brunete Álvarez et al.

(10) Patent No.: US 8,186,614 B2
(45) Date of Patent: May 29, 2012

(54) PROTECTION AGAINST DIRECT LIGHTNING STRIKES IN RIVETED AREAS OF CFRP PANELS

(75) Inventors: Desiderio Sánchez-Brunete Álvarez, Madrid (ES); Luis Manuel Descalzo Fernández, Madrid (ES)

(73) Assignee: Airbus Operations S.L., Getafe (ES)

( * ) Notice: Subject to any disclaimer, the term of this patent is extended or adjusted under 35 U.S.C. 154(b) by 429 days.

(21) Appl. No.: 12/552,639

(22) Filed: Sep. 2, 2009

(65) Prior Publication Data

US 2010/0219287 A1 Sep. 2, 2010

(30) Foreign Application Priority Data

Feb. 27, 2009 (ES) .................................. 200900554

(51) Int. Cl.
*B64D 45/02* (2006.01)
(52) U.S. Cl. ...................... 244/1 A; 244/132; 361/218
(58) Field of Classification Search .................. 244/1 A, 244/132, 131; 361/218
See application file for complete search history.

(56) References Cited

U.S. PATENT DOCUMENTS

| | | | | |
|---|---|---|---|---|
| 2,212,580 A * | 8/1940 | Ayers | | 36/68 |
| 3,755,713 A * | 8/1973 | Paszkowski | | 361/218 |
| 4,502,092 A * | 2/1985 | Bannink et al. | | 361/218 |
| 4,630,168 A * | 12/1986 | Hunt | | 361/218 |
| 4,755,904 A * | 7/1988 | Brick | | 361/117 |
| 4,884,929 A * | 12/1989 | Smith et al. | | 411/3 |
| 4,891,732 A * | 1/1990 | Jones | | 361/218 |
| 5,175,665 A * | 12/1992 | Pegg | | 361/218 |
| 5,499,782 A * | 3/1996 | Domine | | 244/1 A |
| 5,709,356 A * | 1/1998 | Avenet et al. | | 244/1 A |
| 5,845,872 A * | 12/1998 | Pridham et al. | | 244/1 A |
| 6,327,132 B1 * | 12/2001 | Andrivet et al. | | 361/218 |
| 7,740,434 B2 * | 6/2010 | Kamino et al. | | 411/372.5 |
| 7,886,439 B2 * | 2/2011 | Braden et al. | | 29/854 |
| 2008/0078864 A1 * | 4/2008 | Wilkerson et al. | | 244/1 A |
| 2008/0297967 A1 * | 12/2008 | Winter et al. | | 361/117 |
| 2009/0184199 A1 * | 7/2009 | Leisten et al. | | 244/1 A |
| 2010/0108804 A1 * | 5/2010 | Oguri et al. | | 244/1 A |
| 2010/0224724 A1 * | 9/2010 | Kamino et al. | | 244/1 A |
| 2010/0276536 A1 * | 11/2010 | Lambert et al. | | 244/1 A |
| 2010/0320315 A1 * | 12/2010 | Kashiwagi et al. | | 244/1 A |

FOREIGN PATENT DOCUMENTS

GB 2212580 A * 7/1989

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

A metalization structure of aircraft panels and process for obtaining such structure including a panel made in composite material, the panel including a metal mesh or foil in its outer part, said panel further including a bore which in turn comprises a shank and an upper countersinking, such that the mentioned panel is fixed to another structural aircraft element by means of metal fixing elements. The structure includes a metallization layer arranged on the upper countersinking, extending in the adjacent area of the metal mesh or foil, such that it is ensured that electrical continuity exists between the upper countersinking and the metal mesh or foil during the time that the lightning bolt strikes the structure of the panel, further ensuring that most of the current discharged by the lightning bolt is conducted over the surface of the structure of the panel.

12 Claims, 1 Drawing Sheet

PROTECTION AGAINST DIRECT LIGHTNING STRIKES IN RIVETED AREAS OF CFRP PANELS

FIELD OF THE INVENTION

The present invention relates to a metalization of the outer surface of structural aircraft panels made in non-metal materials, particularly in carbon fiber composite materials "CFRP", mainly in fuel tanks, as well as to a process for obtaining such metallization.

BACKGROUND OF THE INVENTION

Conventional aeronautical structures have typically been made for decades with metal materials such as aluminium, stainless steel or titanium. Thus, the protection of these conventional aeronautical structures against lightning strikes has been based on the good electrical continuity inherent to said metal materials.

Aeronautical structures are currently increasingly made in composite materials, such as carbon fiber, since these materials provide the configured structures with a low specific weight. However, composite materials do not have a good electrical continuity, whereby it is necessary to provide them with a special structure so that the aeronautical structures that they form are protected against lightning strikes. In the event of not having these configurations, when a structure of composite materials is struck by a lightning, hot spots and/or possible electric arcs are generated, this being critical in the event that it is a fuel tank.

One of the known solutions consists of performing a metallization of the structures manufactured in composite materials, one or several foils or meshes of metal materials, such as aluminium, copper or bronze, being used to that end, said foils or meshes being adhered during the process for manufacturing the aeronautical structures (typically panels) to the outer face therefore, which will receive the direct lightning strike.

Current technology ensures a good, and at the same time robust, integration of the mentioned outer metal layer with the assembly of composite material, typically carbon fiber. This metalization ensures a good protection of the structure and maximizes the conduction of the electric charge discharged by the strike towards the discharge ("exit") devices to the atmosphere. However, the efficiency of this metalization solution is reduced during the drilling process of the aeronautical structures (particularly panels), this drilling is necessary to connect the structures or panels to other components of the structures, such as ribs, spars or stringers. Thus, the drilling of the panels and their subsequent countersinking ensures that the head of the rivets/fasteners does not create an aerodynamic protrusion, but it breaks the outer metalization (foils or meshes), and a dielectric contact is being created between the head of the rivet and the countersinking. This will not ensure a good electrical contact between the head of the rivets and the "metallization" layers, meshes or foils. This gives rise to increasing the energy that is passed to the internal structure through bolt, rivet.

Various processes are known for re-establishing the good electrical continuity between the head of the rivet and the metallized structure (meshes or foils). One of the most used solutions consists of using special washers ensuring the contact between the head of the rivet and the metallization mesh of the structures or panels, although they have problems of weight, of increase of the aerodynamic drag of the structure as the profile thereof is not continuous, while at the same time the assembly of said washers increases the manufacturing time, furthermore basing the protection against lightning on an element which can be lost or forgotten during the assembly or maintenance of the aircraft.

The present invention offers a solution to the aforementioned problems.

SUMMARY OF THE INVENTION

According to a first aspect, the present invention relates to a "metallization" of the outer surface of structural aircraft panels made in composite materials, which comprises fixing a metal deposit on the countersunk structure and the adjacent area of the metalization structure, which ensures the existence of electrical continuity between the head of the rivet, the countersinking area and the metalization structure of the aeronautical structure or panel.

In a second aspect, the present invention develops a process for the subsequent metalization in the countersinking area of the aeronautical structures of composite materials, i.e., it offers a process for re-establishing the metalization mesh or foil of aeronautical structures (typically panels) after they have been subjected to boring and subsequent countersinking. The process of the invention does not add weight to the handled aeronautical structures, while at the same time it is an industrialized and non-manual process.

The process and the structure according to the invention ensures the electrical continuity during the time the lightning bolt strikes the structure of composite material, ensuring that most part of the discharged current is conducted over the surface, limiting the current conducted or derived into the structure through-out the rivet, reducing the subsequent risk of sparks or hot spots, especially if the structure forms part of a fuel tank. In addition, the problem of forgetting to install the washer which existed in the known art is eliminated, since the process is now an automated process in which the surface on which the rivet in question will be seated is previously prepared by means of metalization.

The process of the invention comprises the following steps:
a) boring and countersinking the structure of composite material comprising, in turn, a metalization structure in the form of a mesh or of metal foil layers;
b) preparing and cleaning the surface on which the boring has been performed and which will be the object of metalization;
c) metalizing the previous surface only in the upper part thereof in which the head of the rivet will be seated, by means of using a template suitable for such purpose.

Other features and advantages of the present invention will be inferred from the following detailed description of an illustrative embodiment of its object in relation to the attached figures.

DETAILED DESCRIPTION OF THE INVENTION

Figure 1:
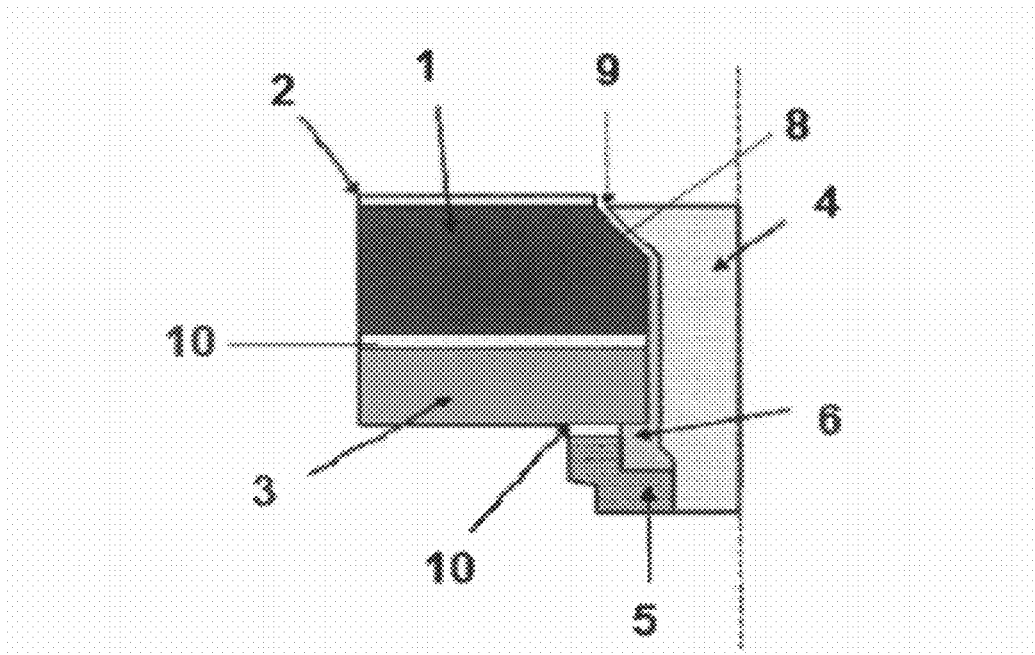
FIG. 1 shows a section view of the known configuration of a riveted connection in a structure of composite material.

Thus, the present invention relates to a metalization structure of the outer surface of structural panels 1 made in composite material comprising in turn a metal mesh or foil 2, said panels 1 being fixed to other structural elements 3, such as ribs, spars or stringers, by means of rivets 4, fixed by means of a binding nut 5 at the lower area of the structure. The metalization layer 7 of the invention ensures that electrical continuity exists between the head of the rivet 4, the countersinking area 8 and the metal mesh or foil 2 of the panel 1 or aeronautical structure. As observed in FIG. 2, the metallization layer 7 is confined to the upper part of the connection of the head of the rivet 4 with the metal mesh or foil 2 of the panel 1, whereas there may or may not be in the rest of the gap area between the rivet 4 and the aeronautical structure a sealing material layer 6 the main function of which is the tightness of the assembly.

Thus, FIG. 1 details the current configuration of a riveted connection 1 in which a dielectric area 9 between the head of the rivet 4 and the countersinking area 8 can be seen.

Figure 2:
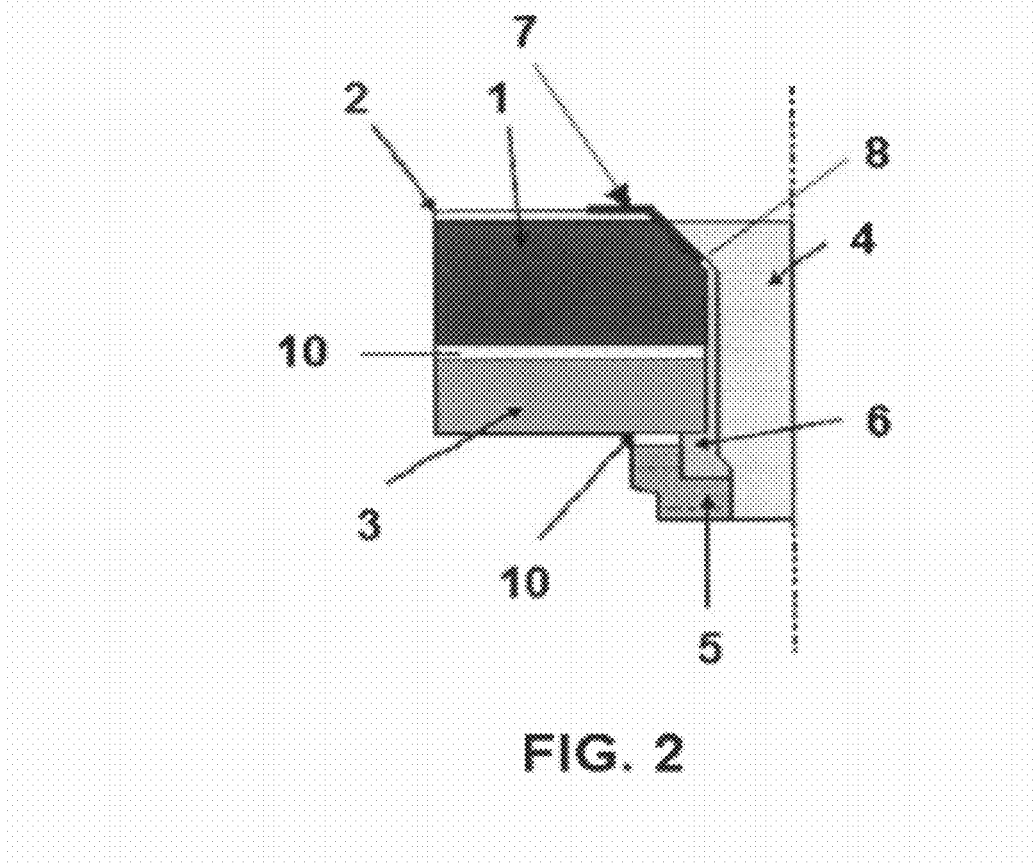
FIG. 2 shows a section view of the configuration of a riveted connection in a structure of composite material according to the present invention.

On the other hand, and in contrast to the above, FIG. 2 shows, according to the present invention, the electrical continuity existing between the head of the rivet 4 and the countersinking area 8, as a result of the existence of the metalization layer 7 after performing the process of the invention, which will be described in detail below.

To make the metalization layer 7, the known metal spraying process is used, the technology and equipment of which are available on the market, although its use is currently limited to different types of surface protection. The use of this process, i.e., melting a rod of aluminium, copper or another metal, for example by electric arc, inside an intense flow of inert gas, generates a fine spray of molten metal which firmly adheres to the surface in question.

The suitable metalization thickness can be obtained by means of the interposition of one or several templates in the path of the spraying, which is necessary to comply with the requirements of each of the areas identified by Aeronautical Regulations for the protection of aircraft against lightning.

The metalization layer 7 of the invention cannot be of aluminium due to galvanic corrosion problems with the CFRP, whereby the rod to be melted by means of metal spraying to generate the metalization layer 7 will be copper, bronze or any other material electrochemically compatible with the metal mesh or foil 2 of the panel 1, and at the same time with the rivet 4.

The metal spraying process involves difficulties for the application to the field of the invention, since the adjustment range to ensure the electrical continuity is of the order of microns, whereas the diameter of the device (typically a spray head or gun) is about ten times greater. The difficulty becomes even worse due to the fact that the metalization layer 7 must be confined only to the upper part for seating the head of the rivet 4 with the metal mesh or foil 2 of the panel 1 because otherwise a path would be created for the current towards the inside of the structure (which is critical in the case of fuel tanks).

The scope of application of the invention is for panels or structures of composite materials for aircraft in general, although the preferred application will be in structures for aircraft fuel tanks.

In a second aspect, the present invention develops a process for the subsequent metalization in the countersinking area 8 of aeronautical structures of composite materials. The process of the invention does not add weight to the handled aeronautical structures, while at the same time it is an industrialized and non-manual process.

The mentioned process comprises the following steps:

a) preparing the panel 1 or structure of composite material in the factory;

b) boring and countersinking the structure or panel 1 of composite material;

c) cleaning, blowing and degreasing the area to be metalized;

d) placing a template for confining the metalization to the metalized part 7;

e) metalizing by means of metal spraying;

f) placing rivets 4 and nuts 5;

g) applying protection and paint layers 10.

Modifications comprised within the scope defined by the following claims can be introduced in the preferred embodiments which have just been described.

The invention claimed is:

1. An aircraft panel made in composite material, the panel comprising:

a metal mesh or foil on an outer surface of the panel;

a bore including a shank and an upper countersinking, such that the panel is fixed to another structural aircraft element by metal fixing elements;

a metallization layer made of a conductive material arranged on the upper countersinking, and extending to electrically contact the metal mesh or foil, such that electrical continuity exists between the upper countersinking and the metal mesh or foil during a time that a lightning bolt strikes the panel, such that most of a current discharged by the lightning bolt is conducted over the outer surface of the panel, the metallization layer extending into the upper countersinking and ending before an end of the upper countersinking.

2. The aircraft panel according to claim 1, wherein the metalization layer is made by a metal spraying process, melting a rod of metal by electric arc inside an intense flow of inert gas, generating a fine spray of molten metal forming the layer, which firmly adheres on the upper countersinking and on an adjacent area of the metal mesh or foil.

3. The aircraft panel according to any of claim 1 or 2, wherein the metalization layer is of a material electrochemically compatible with the metal mesh or foil of the panel and with material of the fixing element.

4. The aircraft panel according to claim 3, wherein the metalization layer is of copper or of bronze.

5. The aircraft panel according to claim 1, wherein the panel is of carbon fiber composite material.

6. The aircraft panel according to claim 1, further comprising:

a sealing material layer in a rest of a gap area between the fixing element and the structural aircraft element.

7. The aircraft panel according to claim 1, wherein the panel it forms part of an aircraft fuel tank.

8. A process for making an aircraft panel made in composite material according to claim 1, comprising:

preparing the panel of composite material in a factory;

boring and countersinking the panel of composite material;

placing at least one template for confining subsequent metalization only to the metalization layer, which will be arranged on the upper countersinking, extending in an adjacent area of the metal mesh or foil;

metalizing and forming the metalization layer by a metal spraying process, melting a rod of metal by electric arc inside an intense flow of inert gas, generating a fine spray of molten metal forming the layer, which firmly adheres on the upper countersinking and on the adjacent area of the metal mesh or foil; and placing the metal fixing elements.

9. The process for making a structure of an aircraft panel according to claim 8, wherein the placing at least one template includes placing several templates which are interposed in a path of the metal spraying of the metalizing, such that a thickness of the metalization layer can be varied according to a precise thickness to comply with Aeronautical Regulation requirements for protection of aircraft against lightning.

10. The process for making an aircraft panel according to claim 8, wherein the rod of the metal spraying method in the metalizing is of copper or of bronze.

11. The process for making a structure of an aircraft panel according to claim 8, further comprising:
cleaning, blowing and degreasing an area in which the metalization layer will be arranged between the boring and the metalizing.

12. The process for making a structure of an aircraft panel according to claim 8, further comprising:
applying protection and paint layers on the outer surface of the panel after the placing the metal fixing elements.

* * * * *